United States Patent
Tsuru et al.

[11] Patent Number: 5,904,426
[45] Date of Patent: May 18, 1999

[54] NON-RETAINER TYPE ROLLING BEARING

[75] Inventors: Kazuo Tsuru, Nara; Tsugio Matsushita; Hiroshi Ono, both of Kashiwara; Nobuhito Sakai, Kashiwara, all of Japan

[73] Assignee: Koyo Seiko Co., Ltd., Osaka, Japan

[21] Appl. No.: 08/915,614

[22] Filed: Aug. 21, 1997

[30] Foreign Application Priority Data

Sep. 30, 1996 [JP] Japan ................... 8-259072

[51] Int. Cl.$^6$ ............................................ F16C 33/66
[52] U.S. Cl. ................... 384/462; 384/463; 384/492; 384/909; 384/521
[58] Field of Search .................. 384/463, 462, 384/492, 513, 909, 908, 913, 521

[56] References Cited

U.S. PATENT DOCUMENTS

| | | | |
|---|---|---|---|
| 3,764,188 | 10/1973 | Suska et al. | 384/463 |
| 5,150,398 | 9/1992 | Nishioka et al. | |
| 5,150,974 | 9/1992 | Tamada et al. | 384/463 |
| 5,207,513 | 5/1993 | Kondo et al. | |
| 5,290,070 | 3/1994 | Deits et al. | 384/492 |

FOREIGN PATENT DOCUMENTS

| | | |
|---|---|---|
| 8-54024 | 2/1996 | Japan . |
| WO97 12156 A2 | 4/1997 | WIPO . |

*Primary Examiner*—Lenard A. Footland
*Attorney, Agent, or Firm*—Birch, Stewart, Kolasch & Birch, LLP

[57] ABSTRACT

Each of the inner and outer rings of a non-retainer type rolling bearing has a wear-resistant solid film of a fluorine-containing synthetic resin formed on its track surface. The solid film carries a very small amount of grease having a low vapor pressure, e.g. fluorine-containing grease, as an effective lubricant for the inner and outer rings, and the rolling elements held therebetween, while the solid film is also restrained from producing dust. The amount of the grease does not exceed 5% of the volume of the open space in the bearing.

13 Claims, 3 Drawing Sheets

F I G. 4 (a)
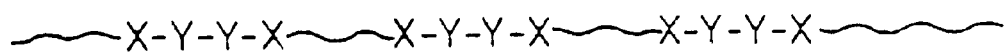
F I G. 4 (b)
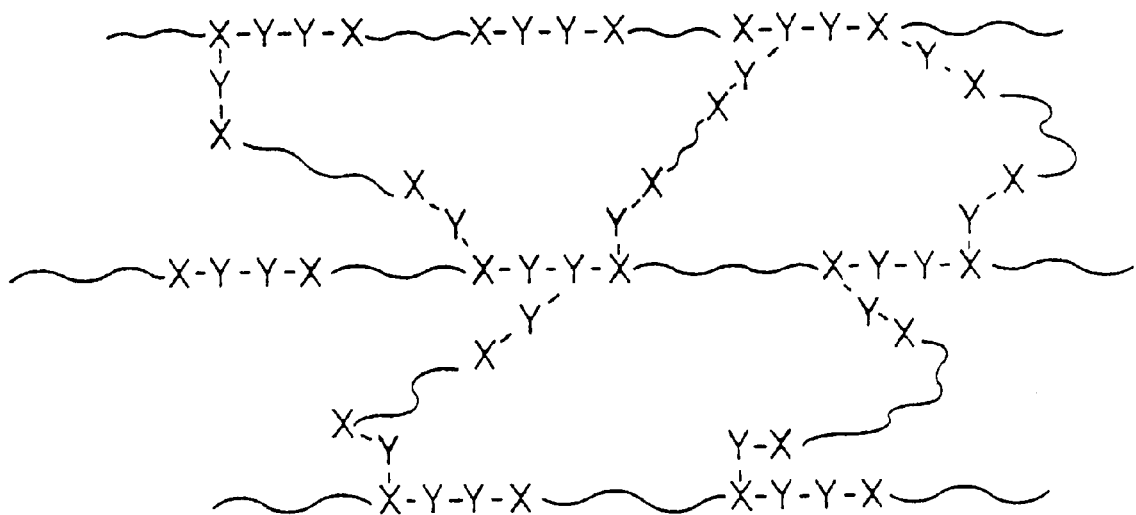

NON-RETAINER TYPE ROLLING BEARING

BACKGROUND OF THE INVENTION

1. Field of the Invention

This invention relates to a rolling bearing of- the type not having any retainer (non-retainer type), and more particularly, to a rolling bearing having a bearing ring of thin wall thickness relative to its outside diameter.

2. Description of the Related Art

A rolling bearing of the type having a thin wall thickness is usually employed when a bearing having a relatively large diameter is required for making, for example, a support for the rotation of any of various kinds of machines. Such a bearing, or more particularly its retainer is, however, insufficient in rigidity.

As a result of rotation, the retainer is deformed and has a lower degree of roundness, and is very likely to make irregular contact with either an inner or an outer ring, become unevenly worn and produce dust of wear.

Such dust exerts an adverse effect on the manufacture of semiconductors, or like devices which have to be manufactured in a clean environment, and no known bearing of the type mentioned above can, therefore, be used in any such environment.

With this invention a non-retainer type rolling bearing which does not have any retainer makes it possible to include a greater number of rolling elements having a smaller distance from one another circumferentially of the bearing.

The smaller spacing between every two adjoining rolling elements, however, makes it likely that they may easily interfere with each other.

There are, thus, likely to occur a number of problems including the wear of the rolling elements, the wear caused on the track surfaces of the rings by the rolling elements sliding thereon, and the rolling motions of the rolling elements at a different speed from one another, resulting in the uneven distribution of the rolling elements, or the fluctuation of torque.

These problems can be improved to some extent or other if it is possible to make a thorough control of various conditions in the manufacture of rolling bearings including the selection of the optimum number and size of the rolling elements. Such a control is, however, very difficult to realize.

SUMMARY OF THE INVENTION

It is, therefore, an object of this invention to provide a non-retainer type rolling bearing which can be manufactured easily without calling for any difficult control of the conditions for its manufacture.

It is another object of this invention to provide a non-retainer type rolling bearing having rings which are sufficiently high in wear resistance not to produce any undesirable amount of dust.

It is still another object of this invention to provide a non-retainer type rolling bearing having an improved rolling characteristics including a smooth operation.

The above objects are basically attained by a non-retainer type rolling bearing which comprises a bearing ring and a plurality of rolling elements held on the track surface of the bearing ring, the track surface having a solid film formed thereon from a fluorine-containing synthetic resin and carrying a very small amount of grease having a low vapor pressure.

The absence of any retainer in the bearing of this invention means the elimination of any dust that has been a drawback of any known bearing having a retainer. The presence of a solid film of a fluorine-containing resin and a very small amount of grease on the track surface of the bearing ring imparts a greatly improved frictional wear resistance to the bearing ring and rolling elements. The bearing ring and rolling elements are, therefore, restrained from getting undesirably worn and producing dust, and ensure a smooth operation of the bearing. The grease hardly scatters or vaporizes, but traps any dust of wear from the solid film effectively to restrain it from scattering.

The rolling elements are preferably balls of a ceramic material. The ceramic material makes it possible to substantially prevent any mutual interference of the balls from causing any unstable movement, or sliding thereof. The ceramic balls make the bearing suitable for use even in a corrosive environment if the solid film is formed on the whole surface of the bearing ring.

The bearing preferably further includes a plurality of load-free ball-shaped separators each disposed between every two rolling elements adjoining each other circumferentially of the bearing ring. The separators prevent any interference of the rolling elements with one another under load and thereby ensure a smooth operation of the bearing.

The bearing ring is preferably formed from bearing steel, martensitic stainless steel, or precipitation hardening type stainless steel.

Other objects, features and advantages of the invention will become apparent from the following description.

BRIEF DESCRIPTION OF THE DRAWINGS

The accompanying drawings, which are incorporated in and from a part of this invention, illustrate embodiment and, together with the description serve to explain the-principle of this invention.

In the drawings:

FIG. 4(a) and 4(b) are diagrams showing the structure of a solid film formed on the inner and outer rings of the bearing.

In all these figures, like components are indicated by the same numerals.

DETAILED DESCRIPTION OF THE INVENTION

Figure 1:
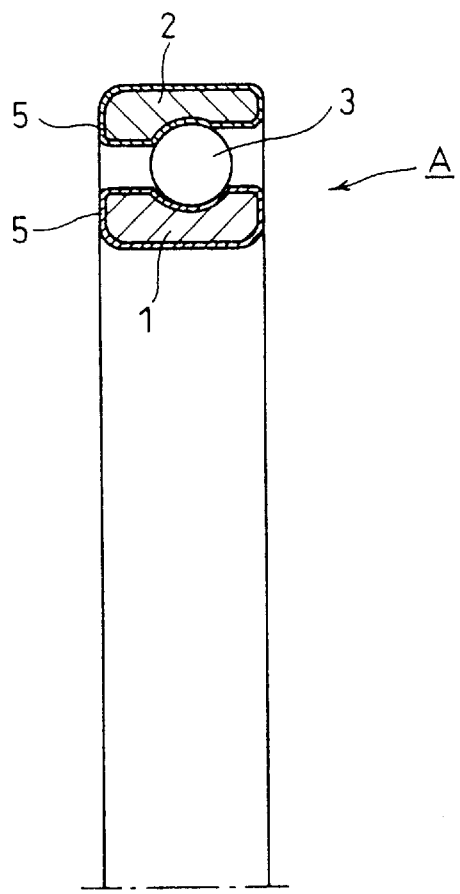
FIG. 1 is a cross sectional view of the upper half of a rolling bearing according to a preferred embodiment of this invention.
Figure 2:
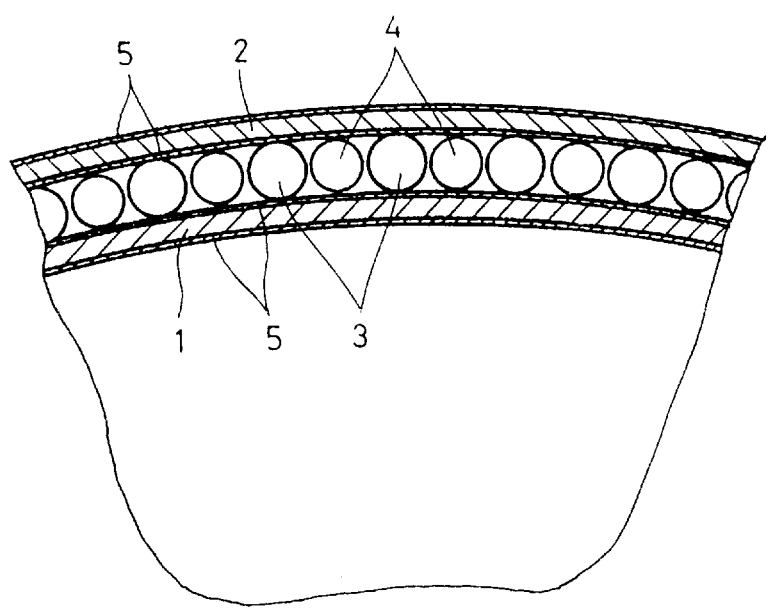
FIG. 2 is a sectional view taken along the line (2)—(2) of FIG. 1.

A rolling bearing according to a preferred embodiment of this invention will now be described with reference to FIGS. 1 and 2. The bearing A is constructed as an angular ball bearing, and does not have a retainer. The bearing A comprises an inner ring 1 (one bearing ring), an outer ring 2 (the other bearing ring), a plurality of rolling elements 3 which roll on the track surfaces 1a and 2a of the inner and outer rings 1 and 2, respectively, and a plurality of ball-shaped separators 4.

Each of the inner and outer rings 1 and 2 has a track groove 1b or 2b in which the rolling elements 3 roll. The outer ring 2 has on one side of its track groove 2b a counterbore 2c which makes it easy to place the rolling elements 3 in position. The rolling elements 3 are spaced apart from one another circumferentially of the inner and outer rings 1 and 2, or along the track grooves 1b and 2b. Each separator 4 is located between two adjoining rolling elements 3. The separators 4 are smaller in diameter than the rolling elements 3 so as to be free from any load. Both of the inner and outer rings 1 and 2 have a small thickness relative to the outside diameter of the bearing Each of the inner and outer rings 1 and 2 has a solid film 5 formed on its whole surface including the track surface 1a or 2a. The solid film 5 on the track surface of at least one of the inner and outer rings 1 and 2 carries a very small amount of grease having a low vapor pressure as a lubricant, though it is not shown.

The inner and outer rings 1 and 2 are both formed from high-carbon chromium bearing steel, such as what is designated as SUJ2 under the Japanese Industrial Standard (JIS). They may alternatively be formed from a material obtained by giving an adequate hardening heat treatment to martensitic stainless steel, such as what is designated as SUS440C under JIS, or precipitation hardening type stainless steel, such as what is designated as SUS630 under JIS.

The rolling elements 3 are formed from a ceramic material consisting mainly of silicon nitride. The ceramic material may consist mainly of silicon nitride ($Si_3N_4$) and include yttria ($Y_2O_3$) or alumina ($Al_2O_3$) as a sintering assistant, and may further include aluminum nitride (AlN), titanium dioxide ($TiO_2$) or spinel ($MgAl_2O_4$) as required. The ceramic material may alternatively be selected from among, for example, alumina ($Al_2O_3$), silicon carbide (SiC), zirconia ($ZrO_2$), magnesium oxide (MgO) and aluminum nitride (AlN). The rolling elements 3 may alternatively be formed from any such metallic material as mentioned above.

The separators 4 are formed from a material obtained by giving an adequate hardening heat treatment to martensitic stainless steel, such as SUS440C (JIS), or precipitation hardening type stainless steel, such as SUS630 (JIS). The separators 4 have a diameter which is smaller by, say, 10 to 50 microns than that of the rolling elements 3.

The solid film 5 is formed from a fluorine-containing synthetic resin. More specifically, it is formed from, for example, a dispersion of the fluorine-containing resin in a thermosetting synthetic resin as a binder. It is preferable to use as the thermosetting resin one which is high in heat resistance, adhesive property, dimensional stability and friction and wear resistance, and which hardly has its adhesive strength lowered even at a high temperature, such as a resin having an imide, or amide-imide bond (e.g., a polyimide, or polyamide-imide resin produced by condensation polymerization). As regards the fluorine-containing resin, it is preferable to use, for example, PTFE (polytetrafluoroethylene), or ETFE (ethylenetetrafluoroethylene) In the event that PTFE is used, it is preferable to select a polymer having a particle diameter of two to three microns and an average molecular weight of $1 \times 10^4$ to $5 \times 10^4$.

The grease having a low vapor pressure is, for example, one containing fluorine, and is used in a very small amount not exceeding 5% of the volume of the open space in the bearing. The grease is applied to the track groove of the inner or outer ring 1 or 2, and is spread to the other area by conditioning rotation The solid film 5 and the grease as described above cooperate in lubricating the inner and outer rings 1 and 2 and the rolling elements 3 very effectively and thereby realizing a drastic reduction of their friction and wear.

As the separators 4 prevent the rolling elements 3 from interfering with one another, it is possible to stabilize the movement of the rolling elements 3 and restrain any fluctuation of torque to thereby ensure a smooth operation of the bearing. The solid film 5 itself is also highly resistant to wear owing to its material as described above, and the grease as described above is unlikely to scatter or vaporize easily. Moreover, the dust of wear produced by the solid film 5 is trapped by the grease and its scattering is greatly reduced.

Therefore, the rolling bearing A embodying this invention has a long life, while exhibiting excellent rolling characteristics, even in a severe environment, such as a vacuum, high- or low-temperature, or corrosive environment.

Figure 3:
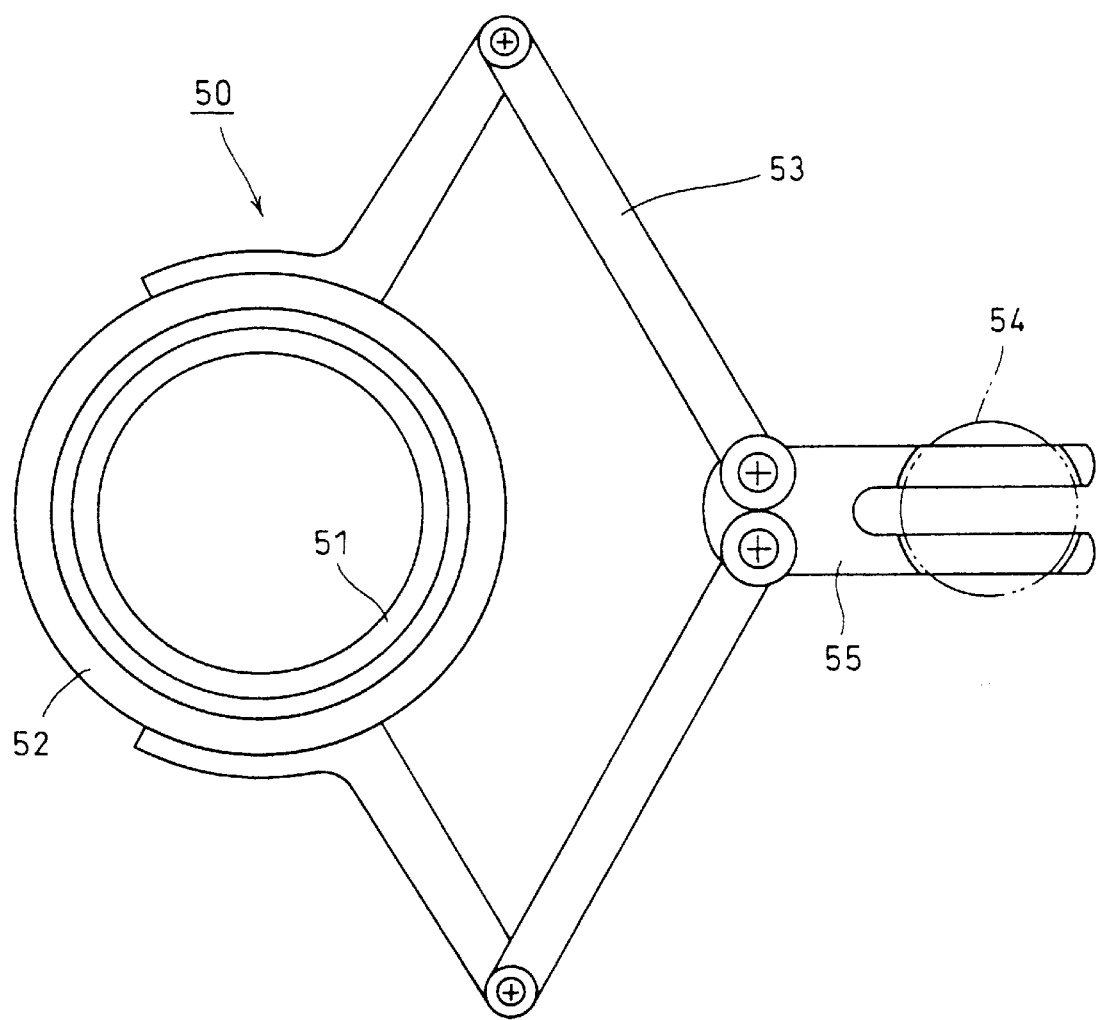
FIG. 3 is a top plan view of an apparatus in which the bearing is used.

Reference is now made to FIG. 3 showing a system 50 employed for conveying semiconductor wafers, or the like in an apparatus for PVD or CVD. Two motors 52 are installed about a hollow shaft 51. Expansible arms 53 are attached to the rotors of the motors 52. A conveying platform 55 on which a semiconductor wafer 54, or the like is mounted is attached to the distal ends of the expansible arms 53. A radial type rolling bearing A is disposed between the shaft 51 and the rotors of the motors 52.

This invention is not limited to its specific embodiment as described above, but a variety of variations or modifications thereof are possible.

(1) Although its specific embodiment has been described by way of an angular ball bearing, this invention is applicable to any other type of rolling bearing.

(2) Although the solid film 5 has been described as being formed on the inner and outer rings 1 and 2, it can also be formed on the rolling elements 3 and the separators 4. Although the solid film 5 has been described as being formed not only on the track surfaces of the inner and outer rings 1 and 2, but also on their outer surfaces, it does not necessarily need to be formed on their outer surfaces.

(3) Although the materials of the solid film 5 have been mentioned in the foregoing description of the specific embodiment, it can alternatively be formed from a fluorine-containing high-molecular polyurethane compound. The solid film 5 of a fluorine-containing high-molecular polyurethane compound has a three-dimensional network structure which consists mainly of units represented by the general formula —$CxF_2x$—O— (where x is an integer of 1 to 4), and each having an average molecular weight of several millions or more, in which urethane bonds are formed between molecules by a curing reaction.

The three-dimensional network structure is an expression relating to a chemical structure, and does not mean that the film is a network in cross section, but means that it has a dense and homogeneous structure formed by the molecules which are joined to one another in a way forming a network.

Such a compound can be obtained by altering the chemical structure of a fluorine-containing polymer having functional isocyanate groups at its molecular ends as shown by chemical formula 1 below.

A perfluoropolyether (PFPE) derivative is preferably used as a fluorine-containing polymer having functional isocyanate groups, and a more specific example thereof is a FONBLIN Z derivative (such as FONBLIN Z DISOC), which is a product of Montecatini.

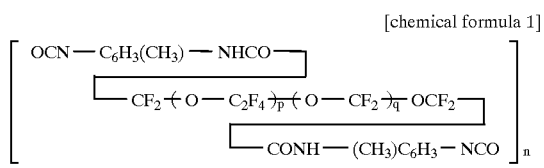

[chemical formula 1]

A process for forming a solid film 5 of a fluorine-containing high-molecular polyurethane compound will now be described by way of example.

(a) The components of the bearing (the inner and outer rings 1 and 2, and the rolling elements 3) are separately dipped in a solution prepared for forming a solid film 5 of a fluorine-containing high-molecular polyurethane compound, or the rolling bearing A as assembled therefrom is dipped therein, and rotated several times, so that a liquid film may adhere to the whole surfaces of the components of the bearing (the inner and outer rings 1 and 2, and the rolling elements 3) (coating step).

The solution is obtained by diluting a fluorine-containing polymer having functional isocyanate groups at its molecular ends [a FONBLIN Z derivative (FONBLIN Z DISCC)] in a solvent (a fluorine-containing solvent, SV90D) until the fluorine-containing polymer has a concentration of 1 mass %.

(b) The bearing A carrying the liquid film is, as a whole, heated at 40 to 50° C. for about one minute, so that the solvent may be removed from the liquid film (drying step). The film still remains liquid and retains fluidity.

(c) Then, it is heated, for example, at 100 to 200° C. for 20 hours (curing step). As a result, the liquid film undergoes a change in chemical structure and thereby a curing reaction to form a solid film 5 of a fluorine-containing high-molecular polyurethane compound.

More specifically, the molecules of the fluorine-containing polymer in the liquid film undergo four curing reactions as shown by chemical formulas 2 to 5 below and are thereby united together by urethane bonds with the elimination of the end isocyanate (NCO) groups to form a three-dimensional network structure The urethane bonds form a linear cross-linkage as shown diagrammatically in FIG. 4(*a*) as a result of the curing reactions shown by chemical formulas 2 and 3, and form a three-dimensional cross-linkage as shown diagrammatically in FIG. 4(*b*) as a result of the curing reactions shown by chemical formulas 4 and 5. FIGS. 4(*a*) and 4(*b*) show chemical formula 1 diagrammatically in a simplified form as shown by chemical formula 6 below.

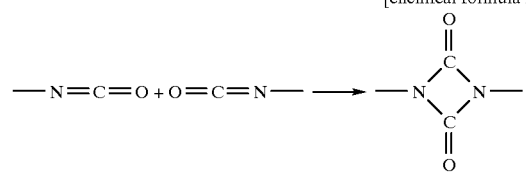

[chemical formula 2]

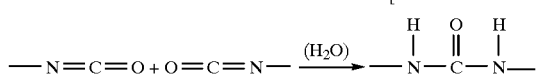

[chemical formula 3]

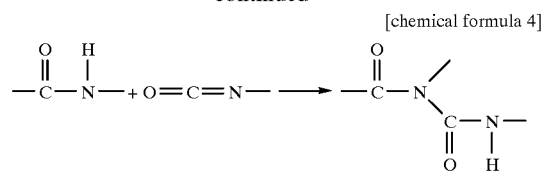

[chemical formula 4]

[chemical formula 5]

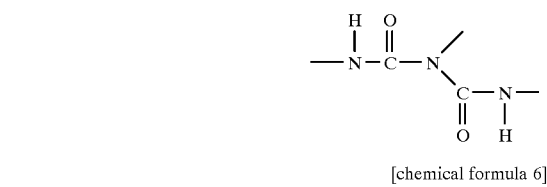

[chemical formula 6]

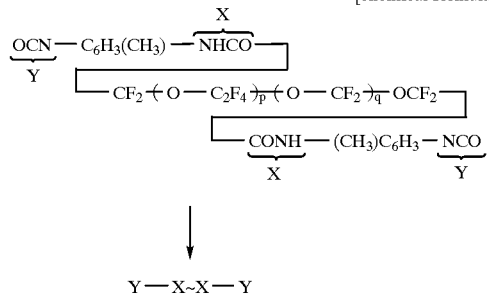

The solid film 5 of a fluorine-containing high-molecular polyurethane compound having a three-dimensional network structure forms a dense coating on the materials to be coated, and also has self-lubricating property. It, therefore, restrains dust from being produced by any of the bearing components as a result of its wear, or peeling during its rolling, or sliding movement. It also makes it possible to avoid any direct contact of the bearing components with one another.

The solid film 5 of a fluorine-containing high-molecular polyurethane compound may alternatively be so formed as to contain a fluorine-containing polymer, such as fluoropolyether, dispersed flowably in its three-dimensional network structure formed by the urethane bonds uniting the molecules together. In this case, the solution to be prepared for the coating step as described at (a) above may be of a mixture in appropriate proportions of a fluorine-containing polymer having functional isocyanate groups [for example, a product having the tradename FONBLIN Z Derivative (such as FONBLIN Z DISOC)] and a fluorine-containing polymer having no functional group [for example, a product having the tradename FONBLIN Z Derivative (such as FONBLIN Z-60)] as a fluorine-containing compound. The fluorine-containing polymer having no functional group does not combine with the fluorine-containing polymer having functional groups during the curing step (c), but is flowable in the solid film 5 of a fluorine-containing high-molecular polyurethane compound to exhibit a lubricating action by oozing out on the film surface, or otherwise.

The fluorine-containing polymer is not limited to the above fluorine-containing polymer having no functional group, but may alternatively be selected from fluorine-containing polymers having functional groups as shown by chemical formulas 7 to 9.

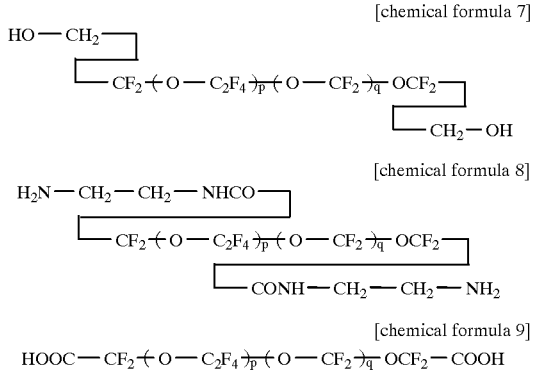

According to this invention, the solid film and the grease having a Low vapor pressure enable a drastic reduction of dust rising from the bearing rings and rolling elements, as well as their own dust, and as they also enable a lowering of any frictional resistance, they contribute to improving the dust restraining property and operational stability of the bearing.

According to this invention, the ceramic rolling elements hardly produce any dust even if they may interfere with one another.

According to this invention, the load-free ball-shaped separators prevent the rolling elements under load from interfering with one another.

It is, therefore, possible to avoid any sliding, or uneven distribution of the rolling elements resulting from their irregular movements at a different speed from one another, and thereby ensure the operational stability of the bearing. According to this invention, the bearing rings can be formed at a low cost from bearing steel, and the solid film covering the whole surfaces of the races improves their corrosion resistance, so that the bearing may be suitable for use even in a corrosive environment.

Thus, the rolling bearing of this invention can advantageously be used in a clean environment as required for any job of high accuracy, as in the process of manufacture of semiconductors, since it hardly contaminates the atmosphere in any such environment, but contributes to achieving an improved yield in the manufacture of e.g. semiconductors, while it exhibits a long life in a high-temperature, or corrosive environment, too.

While there has been described what is at present considered to be preferred embodiment of this invention, it will be understood that various modifications may be made therein, and it is intended to cover in the appended claims all such modifications as fall within the true spirit and scope of this invention.

What is claimed is:

1. A non-retainer rolling bearing comprising:
    a bearing ring carrying a wear-resistant solid film on a track surface thereof;
    a lubricant having an action of trapping dust of wear from said solid film and a lubricating action;
    a plurality of rolling elements held on said track surface; and
    a plurality of ball-shaped separators each disposed between every two of said rolling elements adjoining each other circumferentially, and having a diameter which is smaller than that of said rolling elements.

2. The bearing as set forth in claim 1, wherein said bearing ring is of a material selected from the group consisting of bearing steel, martensitic stainless steel and precipitation hardening type stainless steel.

3. The bearing as set forth in claimed 1, wherein said film is of a-fluorine-containing synthetic resin.

4. The bearing as set forth in claim 1, wherein said lubricant is grease having a predetermined vapor pressure.

5. The bearing as set forth in claim 1, wherein said film is of a fluorine-containing synthetic resin, and said lubricant is grease having a predetermined vapor pressure.

6. The bearing as set forth in claim 1, wherein said rolling elements are of a ceramic material, and said separators are of stainless steel.

7. A non-retainer type rolling bearing comprising:
    an inner ring carrying on its track surface a first wear-resistant solid film, and a first lubricant having an action of trapping dust of wear from said film and a lubricating action, said first lubricant being a fluorine-containing grease;
    an outer ring carrying on its track surface a second wear-resistant solid film, and a second lubricant having an action of trapping dust of wear from said film and a lubricating action, said second lubricant being a fluorine-containing grease; and
    a plurality of rolling elements consisting of balls held between said track surfaces of said inner and outer rings.

8. The bearing as set forth in claim 7, further including a plurality of ball-shaped separators each disposed between every two of said rolling elements adjoining each other circumferentially, and having a diameter which is smaller than that of said rolling elements.

9. The bearing as set forth in claim 7, wherein said outer ring has a counterbore on one side of its track groove.

10. The bearing as set forth in claim 7, wherein each film covers a respective whole surface of a respective ring.

11. The bearing as set forth in claim 7, wherein each film is of a fluorine-containing synthetic resin.

12. The bearing as set forth in claim 7, wherein each lubricant includes a predetermined amount of grease having a predetermined vapor pressure.

13. The bearing as set forth in claim 7, wherein each film is of a fluorine-containing synthetic resin, and each lubricant includes a predetermined amount of grease having a predetermined vapor pressure.

* * * * *